(12) United States Patent
Harigae et al.

(10) Patent No.: US 7,226,573 B2
(45) Date of Patent: Jun. 5, 2007

(54) FINE-GRAIN SILVER OXIDE POWDER

(75) Inventors: Kenichi Harigae, Honjo (JP); Yoshiyuki Shoji, Okayama (JP)

(73) Assignee: Dowa Mining Co., Ltd., Tokyo (JP)

( * ) Notice: Subject to any disclaimer, the term of this patent is extended or adjusted under 35 U.S.C. 154(b) by 200 days.

(21) Appl. No.: 10/936,646

(22) Filed: Sep. 9, 2004

(65) Prior Publication Data

US 2005/0050990 A1  Mar. 10, 2005

(30) Foreign Application Priority Data

Sep. 10, 2003  (JP) .............................. 2003-317966

(51) Int. Cl.
*C01G 5/00* (2006.01)

(52) U.S. Cl. .......................... 423/604; 423/23; 423/42; 423/43

(58) Field of Classification Search .................. 423/23, 423/42, 43, 604
See application file for complete search history.

(56) References Cited

U.S. PATENT DOCUMENTS 4,080,210 A * 3/1978 Asada et al. .................. 423/23
2005/0074394 A1* 4/2005 Berube et al. .............. 423/604

FOREIGN PATENT DOCUMENTS

| DE | 31 25 892 C1 | * | 10/1982 |
| JP | 57-111955 A | * | 7/1982 |
| JP | 2001-35255 A | | 2/2001 |

OTHER PUBLICATIONS

The English abstract of JP 2001-035,255 A published Feb. 2001.*
Denshi Zairyou (Electronic Materials), Jul. 2003, vol. 42, pp. 97-101.

* cited by examiner

Primary Examiner—Timothy C. Vanoy
(74) Attorney, Agent, or Firm—Clark & Brody

(57) ABSTRACT

A silver oxide powder that replaces silver powder as a silver conductive paste filler has a specific surface area measured by the BET method is 1.0–25.0 $m^2/g$, average primary particle diameter is 1–50 nm, and average secondary particle diameter is 1–1000 nm. The silver oxide powder is made by preparing a neutralization medium that is an aqueous solution containing one or both of sodium hydroxide and potassium hydroxide in a total amount of 0.5 mole/L or less, simultaneously adding an aqueous solution containing silver salt in an amount of 6.0 mole/L or less and an aqueous solution of at least one of sodium hydroxide and potassium hydroxide to the liquid medium to conduct a neutralization reaction, thereby obtaining a neutralized precipitate, maintaining the liquid at a pH in the range of 12±1.5 during the reaction, and subjecting the precipitate to filtration, washing, and drying.

18 Claims, 4 Drawing Sheets

: 50 nm

FINE-GRAIN SILVER OXIDE POWDER

BACKGROUND OF THE INVENTION

1. Field of the Invention

This invention relates to a fine-grain silver oxide powder particularly suitable as a filler for a conductive paste.

2. Background Art

In the semiconductor field, recent advances in integration density and speed have created a need for finer circuit board wiring and more sophisticated multilayer structures. This has in turn led to a need for silver of a finer particle size for use as a wiring material to be incorporated in conductive paste. In addition, the availability of an ultra-fine-grain silver can be expected to promote application to low-temperature bonding paste and printing of wiring patterns by the inkjet method.

Conventionally, ultra-fine particles of silver have been produced chiefly by vapor deposition. This method of production is unavoidably expensive because it is a slow process requiring a large amount of energy.

Technologies have been developed for using silver oxide as a wiring material, either in place of or together with silver. DENSHI ZAIRYOU(Electronic Materials), July 2003, Vol. 42, P. 97–101, for example, describes use of silver oxide as a filler for conductive paste and proposes inclusion of an appropriate reducing agent in the paste. It is said that when the paste is heated, the silver oxide is reduced to silver and the silver particles simultaneously fuse to form a conductor. On the other hand, JP2001-35255 A teaches a fluid dispersion obtained by individually dispersing silver-containing ultra-fine particles of under 10 nm in an inorganic solvent and says that the silver-containing ultra-fine particles can be silver, silver oxide or a mixture thereof.

SUMMARY OF THE INVENTION

Use of a wiring material containing silver oxide instead of or together with silver enables wiring to be achieved at a lower cost than in the case of using a wiring material prepared using high-cost ultra-fine-grain silver particles. For this, however, the ability to produce ultra-fine-grain silver oxide in an industrially advantageous and stable manner is essential. The object of the present invention is to enable such production and thereby make it possible to provide an inexpensive, high-quality ultra-fine-grain silver oxide powder.

The present invention achieves this object by providing an ultra-fine-grain silver oxide powder which is a silver oxide powder whose specific surface area measured by the BET (Brunauer-Emmitt-Teller) method is 1.0–25.0 $m^2/g$, average primary particle diameter is 1–50 nm, and average secondary particle diameter is 1–1000 nm. The particle size distribution of this ultra-fine-grain silver oxide powder, which was measured by the laser beam method using a 0.2 wt % aqueous solution of sodium hexametaphosphate, is in the range of 1–1000 nm and exhibits a single distribution peak. The half-value width of the diffraction peak on the (111) plane measured by X-ray diffraction was 0.25° or greater.

The ultra-fine-grain silver oxide powder according to the present invention can be produced by preparing a liquid neutralization medium that is an aqueous solution containing one or both of sodium hydroxide and potassium hydroxide in a total amount of 0.5 mole/L or less, simultaneously adding an aqueous solution containing silver salt in an amount of 6.0 mole/L or less and an aqueous solution of at least one of sodium hydroxide and potassium hydroxide to the liquid medium to conduct a neutralization reaction, thereby obtaining a neutralized precipitate, maintaining the liquid at a pH in the range of 12±1.5 during the neutralization reaction, and subjecting the neutralized precipitate to filtration and washing followed by drying.

The neutralization reaction is preferably conducted in the presence of a protective colloid and/or a dispersant and the reaction temperature is preferably maintained at a temperature equal to or higher than the congealing point of the protective colloid and/or dispersant used and equal or lower than 110° C. In this case also, the liquid is maintained at a pH in the range of 12±1.5 during the neutralization reaction. After the neutralized precipitate produced is filtered off from the liquid, it is optionally redispersed in a dispersant or organic solvent and subjected to wet pulverization.

The protective colloid used can be at least one of gelatin, gum arabic, dextrin and polyvinyl alcohol, the dispersant can be at least one of sodium hexametaphosphate and ethylene glycol, and the organic solvent can be at least one among alcohols, esters, ketones and aldehydes.

The ultra-fine-grain silver oxide powder according to the present invention undergoes reduction from silver oxide to silver at a low temperature and is therefore suitable as the filler of a conductive paste or fluid dispersion for forming a silver conductive circuit. In addition, the method according to the present invention enables production of the invention ultra-fine-grain silver oxide powder at low cost.

DESCRIPTION OF THE PREFERRED EMBODIMENTS

Figure 1:
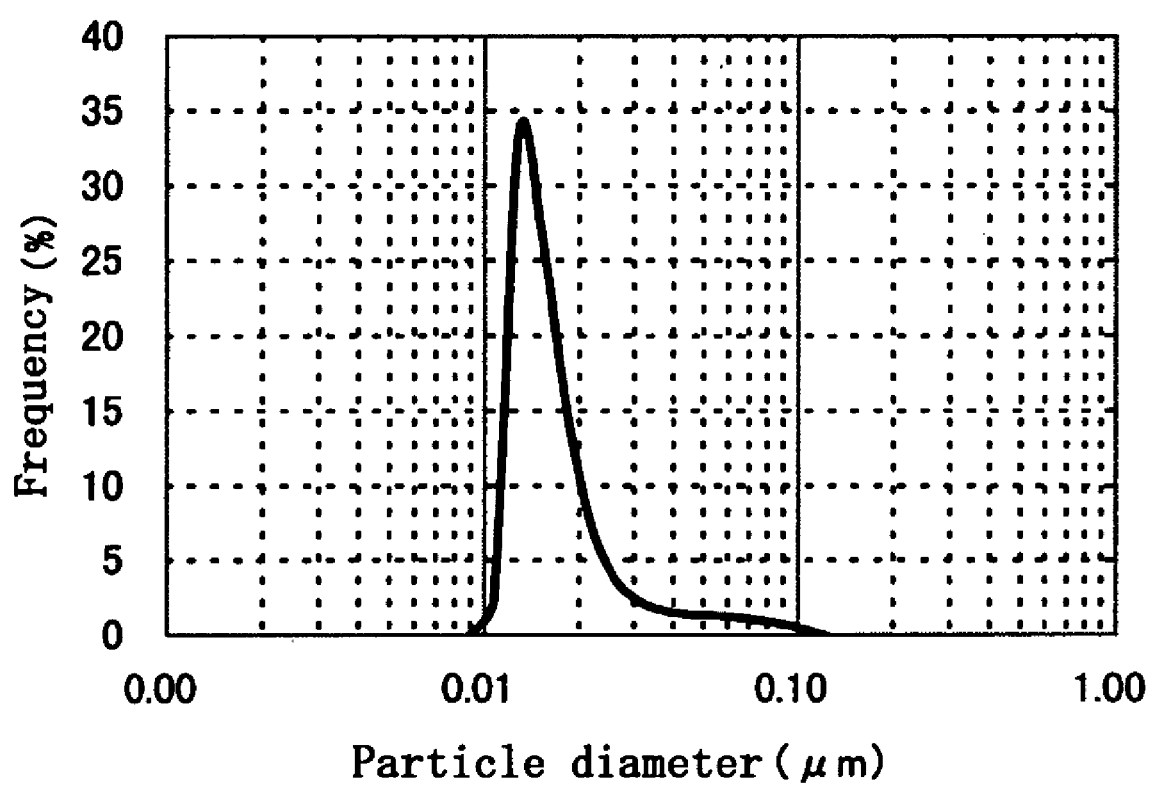
FIG. 1 is a graph showing the particle size distribution of a silver oxide powder according to the present invention.

When a conductive paste utilizing silver powder as filler is used as a means for forming conductive circuitry and electrodes at the surface, interior or exterior of any of various kinds of substrates, the board surface and/or interior is applied or charged with the conductive paste and the board and conductive paste are together subjected to an appropriate heat treatment to remove a volatile medium in the paste by vaporization or decomposition of organic matter, while baking and fusing the remaining silver particles together to form circuitry capable of conducting electricity. As explained earlier, when a paste containing a filler of silver oxide powder rather than silver powder and having a reducing agent such as ascorbic acid co-present therein is subjected to the heat treatment, the silver oxide is reduced to silver that then baked to form a circuit capable of conducting electricity.

In the latter case, the finer the silver oxide powder is, the more suitable it is for forming a fine wiring pattern. Moreover, the reduction temperature can be lowered if the specific surface area and primary particle diameter of the silver oxide powder is appropriate. Specifically, as indicated in the examples set out later, in the case of using an ultra-fine-grain silver oxide powder whose primary particle diameter is 50 nm or less, preferably 30 nm or less, and specific surface area is 1 $m^2/g$ or greater, preferably 2 $m^2/g$ or greater, the reduction temperature at which the silver oxide can be reduced to silver can be brought down to 400° C. or lower, preferably 380° C. or lower.

The specific surface area referred to here is that measured by the BET method. The primary particle diameter is defined as the diameter of the particle unit beyond which no smaller particle can be individually dispersed (primary particle). When the primary particles collect to form clusters (aggregates), each cluster is called a secondary particle. Depending on how the secondary particles are distributed, it may be possible to break them up into dispersed primary particles. The average particle diameter of the secondary particles of the ultra-fine-grain silver oxide powder according to the present invention is in the range of 1–1000 nm.

When the particle size distribution of the ultra-fine-grain silver oxide powder according to the present invention is measured, only a single peak is found even if secondary particle are present. Specifically, when the particle size distribution was measured by the laser beam method using a 0.2 wt % aqueous solution of sodium hexametaphosphate, the particle diameters were found to fall in the range of 1–1000 nm and exhibit a single distribution peak. This means that the powder readily disperses into primary particles even if it exists in the secondary particle state as a dry powder and that in the state dispersed into primary particles it is an ultra-fine-grain silver oxide powder composed of grains falling in a narrow range of distribution.

Further, in the ultra-fine-grain silver oxide powder according to the present invention, the half-value width of diffraction peak on the (111) plane measured by X-ray diffraction was 0.25° or greater. Crystallite size is generally represented by $$D(\text{crystallite size}) = k\lambda/\beta \cos\theta$$

where $\beta$ is half-value width, $\theta$ is diffraction angle, $\lambda$ is the X-ray wavelength and k is a proportionality factor. In other words, the crystallite size decreases with greater half-value width. As indicated in the examples set out later, the half-value width of the ultra-fine-grain silver oxide powder according to the present invention is 0.25° or greater, so that the crystallite size is about 30 nm or less. Considering that the particle diameter of the primary particles is 50 nm or less, preferably 30 nm or less, it follows that each primary particle consists of about 1 crystallite and the individually primary particles are almost all monocrystals.

Such an ultra-fine-grain silver oxide powder according to the present invention can be produced by preparing a liquid neutralization medium that is an aqueous solution containing one or both of sodium hydroxide and potassium hydroxide in a total amount of 0.5 mole/L or less, simultaneously adding an aqueous solution containing silver salt in an amount of 6.0 mole/L or less and an aqueous solution of at least one of sodium hydroxide and potassium hydroxide to the liquid medium (preferably simultaneously introducing the two solutions into the liquid medium through nozzles at constant flow rates) to conduct a neutralization reaction, thereby obtaining a neutralized precipitate, while maintaining the liquid at a pH in the range of 12±1.5, and subjecting the neutralized precipitate to filtration and washing followed by drying. After the neutralized precipitate produced has been filtered off, it is optionally redispersed in a dispersant or organic solvent and subjected to wet pulverization.

It is of critical importance to run the reaction so as to maintain the solution formed of the aqueous alkali solution and silver salt solution at a pH in the range of 12±1.5, preferably pH of 12±1.0. This can be achieved by running the reaction while simultaneously adding the two solutions to the liquid neutralization medium in such manner that the pH does not change even as the reaction between the aqueous alkali solution and the silver salt solution proceeds. As this simultaneous addition suppresses pH fluctuation, it enables silver oxide nuclei to be generated uniformly and the generated nuclei to be grown. The particle diameter can be controlled by making a protective colloid co-present during the reaction.

The production method whose substance was set out in the foregoing can be re-expressed as comprising a step of reacting a silver salt and an alkali in water to obtain a neutralized precipitate (neutralization step), a step of solid-liquid separating the obtained neutralized precipitate, a step of washing and drying the filtered-off precipitate, a step of pulverizing the dry material to obtain a powder, and a step of redispersing the powder in a dispersant or organic solvent and subjecting it to wet pulverization. A silver oxide powder whose BET specific surface area is 1.0–25 $m^2/g$, average primary particle diameter is 1–50 nm and average secondary particle diameter is 1–1000 nm can be obtained by appropriately controlling the conditions of these steps, particularly those of the neutralization step and the wet pulverization step. This will now be explained in detail.

Silver nitrate or the like can be used as the silver salt in the neutralization step. As the alkali there is used a strong alkali (such as potassium hydroxide or sodium hydroxide). The neutralization treatment can be any method among that of adding an aqueous solution of silver salt to an aqueous alkali solution, that of simultaneously adding an aqueous alkali solution and an aqueous solution of silver salt to a liquid medium (actually an aqueous alkali solution) prepared beforehand for conducting the neutralization reaction, or that of adding an aqueous alkali solution to an aqueous solution of silver salt. However, the method of simultaneously adding an aqueous solution of silver salt and an aqueous alkali solution to a liquid medium (an aqueous alkali solution) prepared beforehand for the neutralization reaction is advantageous because it enables elusion of silver oxide into the reaction solution to be suppressed with maintaining the pH of the solution constant (at around pH 12, for example).

An aqueous alkali solution is best used as the liquid medium for the neutralization reaction and the concentration of the aqueous alkali solution best made 0.5 mole/L or less. The concentration of the silver salt solution should be 6.0 mole/L or less, preferably 3.0 mole/L or less. The concentration of the aqueous alkali solution added simultaneously with the silver salt solution is best determined such that the pH of the solution does not fluctuate greatly even when the silver salt solution and aqueous alkali solution react to generate the neutralized precipitate. Lowering the concentration of the silver salt solution generally results in production of a silver oxide powder of smaller particle diameter. Silver oxide powder of a large particle diameter is produced when the concentration of the silver salt solution exceeds the foregoing range (solute concentration range). When the secondary particle diameter exceeds 1000 nm, the reduction temperature at which silver oxide reduces to silver does not appreciably decline, so that the merit of using silver oxide powder to make silver paste decreases. Moreover, making a paste using silver oxide powder having a secondary particle diameter exceeding 1000 nm leads to problems such as that constant quantity discharge from an inkjet becomes difficult and the wiring pattern tends to smear.

By conducting the neutralization reaction in the presence of a protective colloid and/or a dispersant, it is possible to suppress growth of the silver oxide particles, achieve a smaller secondary particle diameter and increase the specific surface area. Usable protective colloids include gelatin, gum arabic, dextrin and polyvinyl alcohol. Usable dispersants include sodium hexametaphosphate and ethylene glycol. Although the protective colloid can be included in the liquid medium for the neutralization reaction or the aqueous alkali solution that is added simultaneously with the silver salt, it is preferably included in the aqueous solution of silver salt from the viewpoint of the stability of the protective colloid. The protective colloid should be used in an amount 5 wt % or less, preferably 2 wt % or less, based on the amount of silver oxide produced. At an amount greater than 5 wt %, the protective colloid may act as a binder that forms agglomerated particles. A dispersant may be made co-present instead of or together with the protective colloid. As the dispersant can be used at least one of sodium hexametaphosphate and ethylene glycol. It should be used in an amount of 0.1 mole/L or less, preferably 0.05 mole/L or less based on the amount of silver oxide produced.

The pH during the neutralization reaction should be within the range of 12±1.5, preferably 12±1.0. The solubility of silver into the solution is very small near a pH of 12.0. A pH outside this range leads to problems such as that particle growth occurs owing to dissolution/precipitation and yield is reduced owing to silver escaping to outside the system. No problems are caused by the reaction temperature insofar as it is no higher than 110° C. However, from the aspects of cost an ease of control relative to changes in exterior air temperature, the reaction temperature is preferably between 30° C. and 60° C., but must equal to or higher than the congealing point of the protective colloid and/or dispersant.

Upon completion of the neutralization reaction, the neutralized precipitate obtained is preferably first ripened and then subjected to solid-liquid separation. The neutralized precipitate is ripened by maintaining the temperature of the suspension following neutralization treatment for around 10 to 120 minutes. This makes the neutralized precipitate uniform.

Solid-liquid separation—drying steps: The suspension obtained by the foregoing process is solid-liquid separated and the filtered-off precipitate is washed with water and dried to obtain a brown to charred-brown dry material. Although the drying can be conducted at any temperature between 30° C. and 250° C., it is preferably conducted at 200° C. or lower because there is a risk of silver oxide decomposition above this temperature. The drying is more preferably carried out at a temperature of 100° C. or lower. The drying is conducted in the air. Drying in a vacuum is also possible.

Wet pulverization step: Although the particle diameter of the obtained dry material is considerably small as obtained, it can be still further improved in particle fineness and dispersiblity. For this it is dispersed in an alcohol, ester, ketone, aldehyde or other organic solvent or in an aqueous solution of sodium hexametaphosphate and subjected to wet pulverization. Use of balls or other such media in conducting the wet pulverization is preferable owing to the enhanced comminution effect. The wet pulverization treatment is conducted by a method of carrying out pulverization while stirring the balls constituting the pulverization media, the powder and the organic solvent or dispersant. The result obtained after removal of the media is either solid-liquid separated or, depending on the intended application, the powder is left dispersed in the organic solvent or dispersant.

Thus, according to the present invention, it is possible by the wet method to produce an ultra-fine-grain silver oxide powder having a specific surface area of 1.0–25.0 $m^2/g$, an average primary particle diameter of 1–50 nm, and an average secondary particle diameter of 1–1000 nm. The production cost by the wet method is lower than that by a dry method which, like the aforesaid JP2001-35 255A, uses vapor deposition to produce fine-grain silver powder. As such, it enables production of an inexpensive ultra-fine-grain silver oxide powder. An inexpensive silver paste can be obtained by blending this inexpensive ultra-fine-grain silver oxide powder into a vehicle optionally together with a reducing agent.

One advantage of a silver type paste made with a silver oxide powder is that it fuses in adhesion at a lower temperature than a high-temperature baking type conductive paste. Because of its low reduction temperature, the ultra-fine-grain silver oxide powder according to the present invention is particularly advantageous in this regard. Up to now, the practice has been to use a resin-hardening paste with circuit boards that cannot stand up high-temperature handling. The present invention makes it possible to use a silver type paste even in such applications, thus improving reliability from the viewpoint of conductivity. Moreover, since the ultra-fine-grain silver oxide powder according to the present invention can be baked at a low temperature, it offers a larger range of options in selecting circuit board materials.

The theoretical density of silver oxide (7.2 g/cc) is lower than the theoretical density of silver (10 g/cc), so that its volumetric contraction during baking is generally larger than that of silver. However, this can be dealt with by mixing silver oxides of different particle diameters or, optionally, by mixing silver oxide powder and silver powder, thereby holding the volumetric contraction to a low level.

EXAMPLES

Example 1

A 48% aqueous solution of sodium hydroxide, 3.3 g, was added to pure water at a temperature of 50° C. to prepare 4.6 L of a liquid medium for neutralization. The pH of the liquid medium was 11.0. Into the liquid medium were simultaneously dripped 400 mL of a 2.5 mole/L aqueous solution of silver nitrate added with gelatin in the amount of 0.5 wt % based on the amount of silver oxide to be obtained and 183 g of a 48% aqueous solution of sodium hydroxide. The amount of alkali was two equivalents relative to the acid. The simultaneous dripping of the two solutions was conducted using metering pumps whose feed flow rates were regulated so that total amounts of the solutions could be added to the liquid medium in 5 min. The pH during the reaction was 11.5–12.5. Following the reaction, the result was ripened under stirring for 10 min. After the ripening, the neutralized precipitate was solid-liquid separated, thoroughly washed and then vacuum-dried at 50° C. to obtain a silver oxide powder.

The obtained silver oxide powder was dispersed in isopropyl alcohol and subjected to wet pulverization under high-speed stirring using stainless steel balls (1 mm diameter) as pulverization media.

The obtained dispersion was dispersed in a 0.2% aqueous solution of sodium hexametaphosphate and measured for particle size distribution by the laser beam method. The measurement was conducted using a Microtrac UPA unit manufactured by Nikkiso Co., Ltd. The profile obtained is shown in FIG. 1. As can be seen in FIG. 1, the distribution had a single sharp peak in the vicinity of 15 nm. The values for d10, d50 and d90 (nm) are shown in Table 1. These indicate the particle diameters at 10 vol. %, 50 vol. % and 90 vol. % on the cumulative particle size distribution curve.

Figure 3:
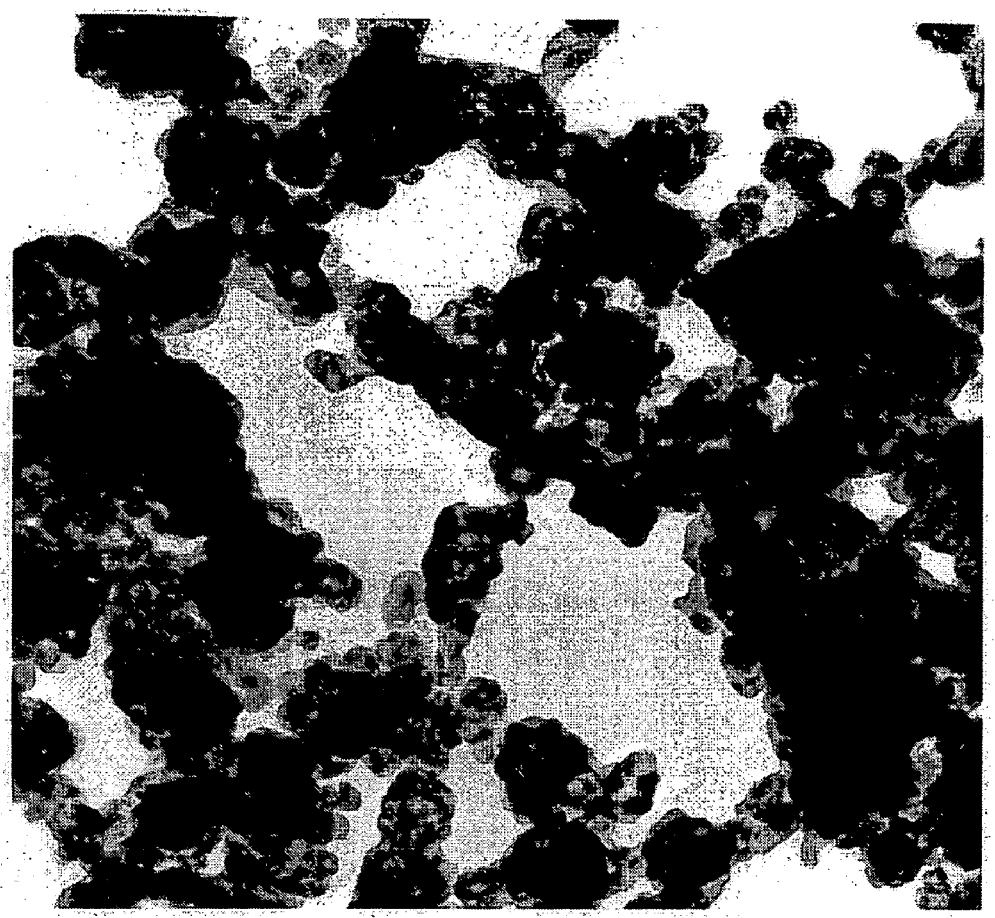
FIG. 3 is a transmission electron micrograph of a silver oxide powder according to the present invention.

The wet-pulverized dispersion was solid-liquid separated and vacuum-dried at 50° C. to obtain a silver oxide powder. The obtained silver oxide powder was subjected to measurement of specific surface area by the BET method, powder X-ray diffraction measurement, transmission electron microscope observation (TEM imaging), and thermal analysis. The results are shown in Table 1. The specific surface area was 7.6 m$^2$/g, the X-ray diffraction half-value width was 0.37°, and the crystallite size was 21 nm. The X-ray diffraction half-value width and crystallite size were obtained by approximating from the diffraction peak on the (111) plane of silver oxide with using the Rhorentz function. The TEM micrograph is shown in FIG. 3. The primary particle average diameter and secondary particle average diameter obtained from this TEM image were 35 nm and 120 nm, respectively. The thermal analysis consisted of heating the silver oxide powder in air at a temperature increase rate of 5° C./min and measuring the silver oxide to silver reduction temperature at the temperature where the endothermic peak appeared, i.e., in the non-equilibrium state. The reduction temperature was found to be 367° C.

Example 2

Example 1 was repeated except for using a 5.0 mole/L aqueous solution of silver nitrate added with gelatin in the amount of 0.25 wt % based on the amount of silver oxide. The powder obtained was evaluated in the manner of Example 1. The results are shown in Table 1.

Example 3

Example 1 was repeated except for using a 1.3 mole/L aqueous solution of silver nitrate added with gelatin in the amount of 0.25 wt % based on the amount of silver oxide. The powder obtained was evaluated in the manner of Example 1. The results are shown in Table 1.

Example 4

Example 1 was repeated except for using a liquid medium prepared by dissolving 25 g of a 48% aqueous solution of sodium hydroxide in pure water at a temperature of 30° C. and using a 0.63 mole/L aqueous solution of silver nitrate added with gum arabic in the amount of 1.0 wt % based on the amount of silver oxide. The pH during the reaction was 12.8–13.2. The powder obtained was evaluated in the manner of Example 1. The results are shown in Table 1.

Example 5

Example 1 was repeated except for omitting the addition of gelatin. The powder obtained was evaluated in the manner of Example 1. The results are shown in Table 1.

Example 6

Example 1 was repeated except for using a liquid medium prepared by adding 0.8 g of a 48% aqueous solution of sodium hydroxide and 3.6 g of sodium hexametaphosphate to pure water and using a 0.63 mole/L aqueous solution of silver nitrate added with gelatin in the amount of 0.5 wt % based on the amount of silver oxide. The powder obtained was evaluated in the manner of Example 1. The results are shown in Table 1.

Example 7

Example 1 was repeated except for using a 2.5 mole/L aqueous solution of silver nitrate added with polyvinyl alcohol in the amount of 0.5 wt % based on the amount of silver oxide. The powder obtained was evaluated in the manner of Example 1. The results are shown in Table 1.

Example 8

Example 7 was repeated except that wet pulverization was not conducted. The neutralized precipitate produced by the reaction was solid-liquid separated and vacuum-dried at 50° C. The silver oxide powder obtained was evaluated. The results are shown in Table 1.

Comparative Example 1

An aqueous solution of sodium hydroxide, 4.6 L, containing 183 g of dissolved 48% sodium hydroxide was regulated to 50° C. and added with 400 L of a 2.5 mole/L aqueous solution of silver nitrate containing polyvinyl alcohol in the amount of 0.5 wt % based on the amount of silver oxide. This amounted to reaction by the so-called reverse neutralization method i.e., by adding an aqueous solution of silver nitrate to an aqueous solution of sodium hydroxide. The neutralized precipitate obtained was solid-liquid separated, thoroughly washed and vacuum-dried at 50° C. The silver oxide powder obtained was evaluated. The results are shown in Table 1.

Figure 2:
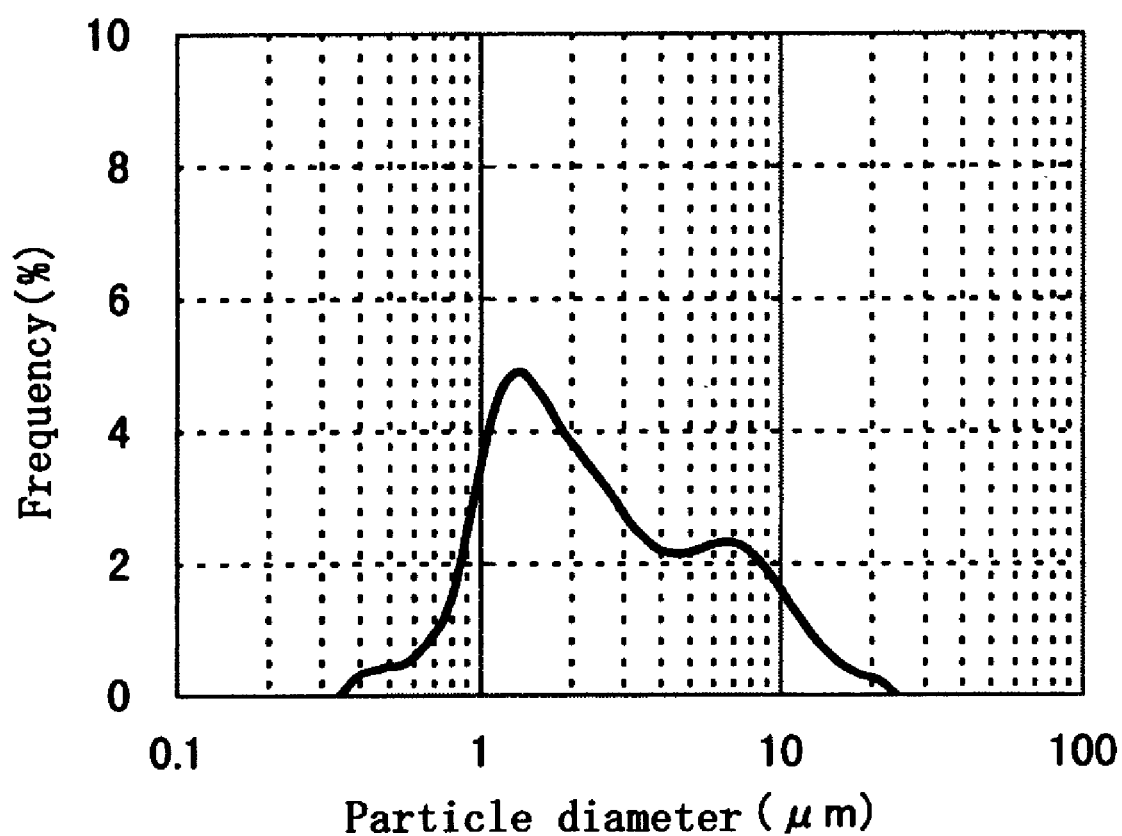
FIG. 2 is graph showing the particle size distribution of a silver oxide powder that is a comparative example.
Figure 4:
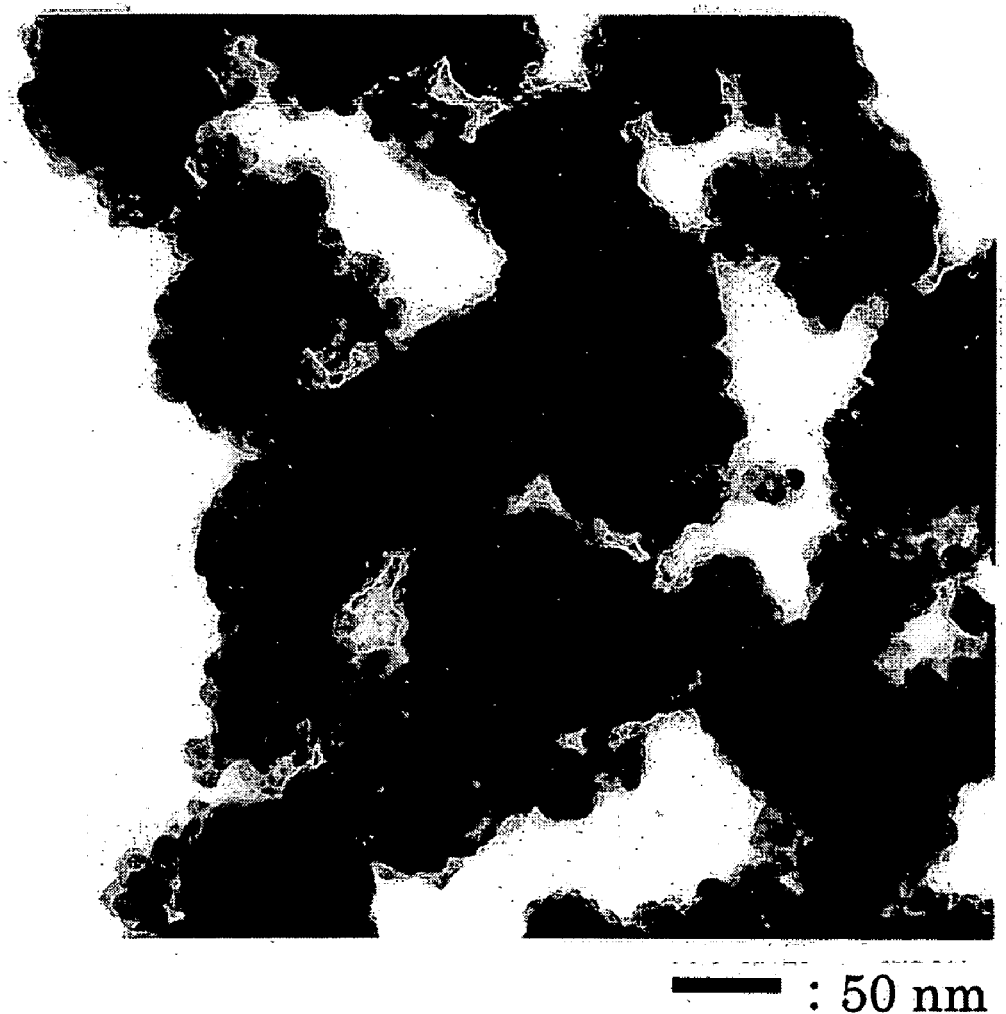
FIG. 4 is a transmission electron micrograph of a silver oxide powder that is a comparative example.

The profile obtained when the particle size distribution of this powder was measured in the manner of Example 1 is shown in FIG. 2. A TEM micrograph of the powder is shown in FIG. 4.

Comparative Example 2

Into a liquid medium, 4.6 L, obtained by dissolving 0.01 mole/L of sodium hydroxide in water at a temperature of 50° C. were simultaneously dripped 400 mL of a 6.5 mole/L aqueous solution of silver nitrate and 476 g of a 48% aqueous solution of sodium hydroxide. The neutralized precipitate produced by the resulting reaction was solid-liquid separated and vacuum-dried at 50° C. The oxide powder obtained was evaluated. The results are shown in Table 1.

TABLE 1

| | Temp °C. | Ag concentration Mole/L | Protective colloid or dispersant Kind | Quantity added wt % | Ph during reaction Low | Ph during reaction High | Neutralization method | Wet pulv. | Particle size distrition by laser beam d10 nm | d50 nm | d90 nm | Diameter by TEM Primary nm | Diameter by TEM Secondary nm | X-ray diffraction* BET m²/g | X-ray diffraction* 1/2-value width ° | X-ray diffraction* Crystallite size nm | Reduction temp °C. |
|---|---|---|---|---|---|---|---|---|---|---|---|---|---|---|---|---|---|
| Ex. 1 | 50 | 2.5 | Gelatin | 0.50 | 11.5 | 12.2 | Simul. | Yes | 11 | 14 | 26 | 20 | 80 | 7.6 | 0.37 | 21 | 367 |
| Ex. 2 | 50 | 5.0 | Gelatin | 0.25 | 11.0 | 12.5 | Simul. | Yes | 12 | 18 | 44 | 20 | 120 | 2.7 | 0.27 | 29 | 372 |
| Ex. 3 | 50 | 1.3 | Gelatin | 0.25 | 11.6 | 12.0 | Simul. | Yes | 12 | 14 | 22 | 20 | 80 | 5.5 | 0.29 | 27 | 378 |
| Ex. 4 | 30 | 0.6 | Gum arabic | 1.00 | 12.8 | 13.2 | Simul. | Yes | 12 | 16 | 30 | 20 | 100 | 7.9 | 0.35 | 23 | 377 |
| Ex. 5 | 50 | 2.5 | None | — | 11.2 | 11.9 | Simul. | Yes | 14 | 20 | 50 | 25 | 140 | 4.9 | 0.30 | 27 | 376 |
| Ex. 6 | 50 | 2.5 | Gelatin Sodium hexametaphosphate | 0.03 0.50 | 11.0 | 11.5 | Simul. | Yes | 10 | 12 | 22 | 25 | 80 | 19.3 | 0.36 | 22 | 354 |
| Ex. 7 | 50 | 2.5 | Polyvinyl alcohol | 0.50 | 10.8 | 11.5 | Simul. | Yes | 11 | 25 | 56 | 20 | 80 | 6.5 | 0.35 | 23 | 348 |
| Ex. 8 | 50 | 2.5 | Polyvinyl alcohol | 0.50 | 11.0 | 11.2 | Simul. | No | 73 | 104 | 159 | 20 | 200 | 5.3 | 0.30 | 27 | 365 |
| C. Ex. 1 | 50 | 2.5 | Polyvinyl alcohol | 0.50 | 10.5 | 13.8 | Reversing | No | 911 | 2038 | 8104 | 50 | 1400 | 1.4 | 0.21 | 38 | 416 |
| C. Ex. 2 | 50 | 6.5 | None | — | 11.1 | 11.4 | Simul. | No | 230 | 1460 | 5540 | 50 | 1200 | 0.9 | 0.30 | 27 | 422 |

*X-ray diffraction: Cu tube

As can be seen from Table 1 (and FIGS. 1–4), the silver oxide powders of Examples 1 to 8 had specific surface areas of not less than 1 m²/g (actually 2–20 m²/g), primary particle diameters of 1–50 nm (actually 1–30 nm), secondary particle diameters of not greater than 1 μm (actually not greater than 200 nm), (111) plane diffraction peak half-value widths by X-ray diffraction of not less than 0.25°, and a single particle size distribution peak (FIG. 1). As a result, the reduction temperatures of the silver oxide powders were 400° C. or lower. In contrast, the silver oxide powders of Comparative Examples 1 and 2 had broad particle size distributions and large secondary particle diameters, so that the balance between specific surface area and particle diameter was poor. As a result, their reduction temperatures were higher than 400° C.

From the results obtained in the Examples and Comparative Examples, it can be seen that in producing the ultra-fine-grain silver oxide powder according to the present invention, advantageous effects arise owing to the adoption of a protective colloid, the implementation of wet pulverization, the simultaneous introduction of silver nitrate and sodium hydroxide into the liquid medium in what is termed the simultaneous neutralization method, and the control of the pH during reaction to within the range of range of 12±1.5. More specifically, it can be seen from a comparison of Comparative Examples 1 and 2 with Example 1 that the use of the protective colloid and implementation of wet pulverization are beneficial for achieving the ultra-fine particles in accordance with the present invention. From a comparison with Examples 1 to 5, it can be seen that conducting the reaction in the presence of the protective colloid makes it possible to obtain ultra-fine particles whose primary particle and secondary-particle diameters are small and specific surface area is large. Further, it can be seen from a comparison of Example 8 with Comparative Example 1 that it is preferable for obtaining the ultra-fine particles in accordance with the present invention to use the neutralization method in which silver nitrate and sodium hydroxide are simultaneously introduced. From Example 6 it can be seen that when a dispersant is added to the liquid medium, the resulting dispersion of the primary particles makes it possible to obtain a powder having a large specific surface area.

What is claimed is:

1. A fine-grain silver oxide dry powder comprising secondary particles which are a cluster of primary particles produced by a neutralization process, whose specific surface area measured by the BET method is 1.0–25.0 m²/g, average primary particle diameter is 1–50 nm, and average secondary particle diameter is 1–1000 nm.

2. A fine-grain silver oxide dry powder according to claim 1, whose particle size distribution measured by the laser beam method using a 0.2 wt % aqueous solution of sodium hexametaphosphate is in the range of 1–1000 nm and exhibits a single distribution peak.

3. A fine-grain silver oxide dry powder according to claim 1 whose half-value width of diffraction peak on the (111) plane measured by X-ray diffraction was 0.25° or greater.

4. A method of producing a fine-grain silver oxide dry powder comprising secondary particles which are a cluster of primary particles produced by a neutralization process, whose specific surface area measured by the BET method is 1.0–25.0 m²/g, average primary particle diameter is 1–50 nm, and average secondary particle diameter is 1–1000 nm, the method comprising:

preparing a liquid neutralization medium that is an aqueous solution containing one or both of sodium hydroxide and potassium hydroxide in a total amount of 0.5 mole/L or less;

simultaneously adding an aqueous solution containing silver salt in an amount of 6.0 mole/L or less and an aqueous solution of at least one of sodium hydroxide and potassium hydroxide to the liquid medium to conduct a neutralization reaction, thereby obtaining a neutralized precipitate;

maintaining the liquid at a pH in the range of 12±1.5 during the neutralization reaction; and subjecting the neutralized precipitate to filtration and washing followed by drying to form the fine grain silver oxide dry powder.

5. A method of producing a fine-grain silver oxide dry powder, comprising:

preparing a liquid neutralization medium that is an aqueous solution containing one or both of sodium hydroxide and potassium hydroxide in a total amount of 0.5 mole/L or less;

simultaneously adding an aqueous solution containing silver salt in an amount of 6.0 mole/L or less and an aqueous solution of at least one of sodium hydroxide and potassium hydroxide to the liquid medium to conduct a neutralization reaction, thereby obtaining a neutralized precipitate;

maintaining the liquid at a pH in the range of 12±1.5 during the neutralization reaction;

filtering off the obtained neutralized precipitate; and redispersing the neutralized precipitate in a dispersant or organic solvent and subjecting it to wet pulverization;

subjecting the obtained dispersion to filtration and washing followed by drying the precipitate.

6. A method of producing a fine-grain silver oxide dry powder, comprising:

preparing a liquid neutralization medium that is an aqueous solution containing one or both of sodium hydroxide and potassium hydroxide in a total amount of 0.5 mole/L or less;

simultaneously adding an aqueous solution containing silver salt in an amount of 6.0 mole/L or less and an aqueous solution of at least one of sodium hydroxide and potassium hydroxide to the liquid medium to conduct a neutralization reaction, thereby obtaining a neutralized precipitate;

maintaining the liquid at a pH in the range of 12±1.5 during the neutralization reaction;

conducting the neutralization reaction in the presence of a protective colloid and/or a dispersant;

conducting the neutralization reaction at a temperature equal to or higher than the congealing point of the protective colloid and/or dispersant used and equal or lower than 110° C.; and subjecting the neutralized precipitate to filtration and washing followed by drying.

7. A method of producing a fine-grain silver oxide dry powder, comprising:

preparing a liquid neutralization medium that is an aqueous solution containing one or both of sodium hydroxide and potassium hydroxide in a total amount of 0.5 mole/L or less;

simultaneously adding an aqueous solution containing silver salt in an amount of 6.0 mole/L or less and an aqueous solution of at least one of sodium hydroxide and potassium hydroxide to the liquid medium to conduct a neutralization reaction, thereby obtaining a neutralized precipitate;

maintaining the liquid at a pH in the range of 12±1.5 during the neutralization reaction;

conducting the neutralization reaction in the presence of a protective colloid and/or a dispersant;

conducting the neutralization reaction at a temperature equal to or higher than the congealing point of the protective colloid and/or dispersant used and equal or lower than 110° C.;

filtering off the obtained neutralized precipitate; and redispersing the neutralized precipitate in a dispersant or organic solvent and subjecting it to wet pulverization;

subjecting the obtained dispersion to filtration and washing followed by drying the precipitate.

8. A method according to claim 6, wherein the protective colloid is at least one of gelatin, gum arabic, dextrin and polyvinyl alcohol.

9. A method according to claim 6, wherein the dispersant is at least one of sodium hexametaphosphate and ethylene glycol.

10. A method according to claim 5, wherein the organic solvent is at least one among alcohols, esters, ketones and aldehydes.

11. A fine-grain silver oxide powder dispersion comprising the silver oxide dry powder set out in claim 1 dispersed in an organic solvent or sodium hexametaphosphate.

12. A dispersion set out in claim 11, wherein the organic solvent is at least one among alcohols, esters, ketones and aldehydes.

13. A fine-grain silver oxide dry powder according to claim 2 whose half-value width of diffraction peak on the (111) plane measured by X-ray diffraction was 0.25° or greater.

14. A method according to claim 7, wherein the protective colloid is at least one of gelatin, gum arabic, dextrin and polyvinyl alcohol.

15. A method according to claim 7, wherein the dispersant is at least one of sodium hexametaphosphate and ethylene glycol.

16. A method according to claim 7, wherein the organic solvent is at least one among alcohols, esters, ketones and aldehydes.

17. A fine-grain silver oxide powder dispersion comprising the silver oxide dry powder set out in claim 2 dispersed in an organic solvent or sodium hexametaphosphate.

18. A fine-grain silver oxide powder dispersion comprising the silver oxide dry powder set out in claim 3 dispersed in an organic solvent or sodium hexametaphosphate.

* * * * *